United States Patent Office 3,475,381
Patented Oct. 28, 1969

3,475,381
PREPARATION OF POLYETHYLENE TEREPHTHALATE BY DIRECT ESTERIFICATION IN THE PRESENCE OF A METAL CITRATE AS A DIRECT ESTERIFICATION CATALYTIC ADDITIVE
John A. Price, Swarthmore, and Mary E. Carter, Philadelphia, Pa., assignors to FMC Corporation, Philadelphia, Pa., a corporation of Delaware
No Drawing. Filed Mar. 23, 1967, Ser. No. 625,311
Int. Cl. C08g 17/013
U.S. Cl. 260—75
7 Claims

ABSTRACT OF THE DISCLOSURE

Preparation of polyethylene terephthalate resin comprising carrying out a direct esterification reaction between ethylene glycol and terephthalic acid in the presence of a metal citrate wherein the metal component is from Group I-A, II-A, IV-A or VII-B of the Periodic Table and then polycondensing the resulting prepolymer in the presence of a conventional polycondensation catalyst.

---

This invention relates to a method for preparing highly polymeric linear polyesters. In particular, it relates to a method of preparing polyethylene terephthalate resin having excellent filament-forming properties.

The manufacture of filament-forming polyester resin from a dicarboxylic acid and a diol is well-known in the art. Generally, in the preparation of such polyesters, a dicarboxylic acid and glycol are first combined and subjected to a direct esterification reaction. The resulting product or prepolymer is then polycondensed at higher temperatures and under reduced pressure in the presence of a polycondensation catalyst to form the polyester resin. Various additives have been suggested heretofore for use in the first stage or esterification step to enhance the reaction. However, generally, none of these have proved entirely satisfactory since many of those known, for instance, are not capable of producing suitable prepolymers for preparing linear polyester resins having sufficiently high molecular weights within a relatively short reaction period.

From a commercial standpoint, it is essential that a polyester resin be produced in the shortest possible time and that the desired degree of polymerization be obtained. A polyethylene terephthalate resin suitable for melt spinning into filaments should have an intrinsic viscosity of preferably not less than about 0.60 (as determined in a 60% phenol and 40% tetrachloroethane solution, wt./wt., at 30° C., a carboxyl content value preferably of about or below 50 equivalents per mililon grams (eq./10⁶ gr. or meq./kg.) and a melting point of about at least 258–260° C.

It is an object of this invention to prepare polyethylene terephthalate resin by a direct esterification and polycondensation process.

Another object of the present invention is to provide an improved method for conducting the esterification reaction between ethylene glycol and terephthalic acid in the preparation of polyethylene terephthalate.

An additional object of this invention is to prepare polyethylene terephthalate suitable for melt extrusion into non-degraded, processable filaments by a direct esterification and polycondensation procedure.

These and other objects are accomplished in accordance with the present invention which involves a method of preparing polyethylene terephthalate wherein the terephthalic acid and ethylene glycol are directly esterified and the product of esterification is polycondensed in the presence of a polycondensation catalyst, the improvement comprising carrying out the direct esterification reaction in the presence of a suitable metal salt of citric acid, in an amount sufficient to improve the properties of the resulting polyester.

The metal salts of citric acid or metal citrates that are used in the direct esterification of the present method may be suitably varied to meet any requirements of reaction conditions and desired product. While the present invention is not to be limited to any particular suitable metal citrates, it has been found that the preferred metal citrates are those wherein the metal component is from Group I-A, II-A, IV-A or VII-B of the Periodic Table (see Merck index, sixth edition, inside front cover). For example, among the first stage or esterification additives that can be used in accordance with the present invention are calcium citrate, lead citrate, lithium citrate, manganese citrate, and sodium citrate or any combination thereof.

Generally, a catalytic quantity of a metal citrate of the present invention in the range of from about $5 \times 10^{-6}$ to about $5 \times 10^{-2}$ mole per mole of terephthalic acid in the subject terephthalic acid-ethylene glycol reaction mixture is used in the present direct esterification method. Higher or lower concentrations of the present catalysts can also be used. However, when concentrations less than the above are used, their effectiveness is generally reduced whereas if concentrations greater than this are used, no further improvement in the present method or desired product is generally obtained.

In general, the preparation of polyesters of the present invention via the direct esterification reaction is carried out with a molar ratio of ethylene glycol to terephthalic acid of from about 1:1 to about 15:1, but preferably from about 1.2:1 to about 2.5:1. The first stage direct esterification step of the present method is generally carried out at temperatures ranging from about 220° C. to about 290° C. in the absence of an oxygen-containing gas at atmospheric or elevated pressure for about 2 to 4 hours. For example, the reaction may be caired out in an atmosphere of nitrogen. When the direct esterification step is completed, as indicated for example, by formation of clear liquid reaction mass, any remaining glycol is distilled off and a polycondensation catalyst is added to the esterified reaction product or prepolymer. The second stage or polycondensation step of the present method is generally carried out under reduced pressures within the range of about 0.05 to 20 mm. of mercury in the absence of an oxygen-containing gas at temperatures ranging from about 260° C. to 325° C. for about 2 to 6 hours.

The polycondensation step of the present method is accomplished through the use of a conventional polycondensation catalysts, for example, antimony trioxide and antimony tetraoxide. The polycondensation catalyst, may, if indicated, be added to the present reaction mixture before initiating the first stage or direct esterification reaction between ethylene glycol and terephthalic acid or after the reaction product thereof is formed. The polycondensation catalysts are generally employed in concentrations ranging from about 0.005 to about 0.5%, based on the weight of the reactants.

The process of this invention may be carried out either continuously or batch-wise.

The following examples of several preferred embodiments will further serve to illustrate the present invention. All parts are by weight unless otherwise indicated.

EXAMPLES

A mixture containing 84 g. (0.5 mole) of terephthalic acid, 62 grams (1.0 mole) of ethylene glycol, and $5 \times 10^{-5}$ mole of a metal salt of citric acid, or metal citrate, as listed in the following table with the exact weight used in the above reaction mixture, was charged to a Fischer-Porter pressure assembly equipped with a nitrogen sparge tube and a distilling arm. The reactor was lowered into an oil bath maintained at 260° C. and flushed for ten minutes with dry nitrogen. A nitrogen pressure of 60 p.s.i. was applied and a distillate of water-ethylene glycol was collected. When a clear liquid, i.e. solution, was obtained, the pressure was reduced to atmospheric and the remaining excess glycol was distilled. Then, the resulting low molecular weight prepolymer was further reacted in the presence of a 0.04%, based on the weight of the prepolymer, of a conventional polycondensation catalyst, e.g. antimony trioxide under sub-atmospheric pressure of about 0.1 mm. of mercury for about four hours at 282° C. to form a polyester resin.

The following table sets forth conditions and results of various reactions carried out as described above.

cludes within its scope the preparation of other polymeric polymethylene terephthalates prepared from glycols of the series $HO(CH_2)_nOH$, where $n$ is 2 to 10 and terephthalic acid and copolyesters containing varied amounts of other suitable dicarboxylic acids such as isophthalic acid.

We claim:

1. In a method for preparing polyethylene terephthalate resin wherein terephthalic acid and ethylene glycol are directly esterified and the product of the esterification is polycondensed in the presence of a polycondensation catalyst, the improvement comprising carrying out the direct esterification reaction in the presence of a catalytic quantity of a metal salt of citric acid direct esterification catalytic additive wherein the metal component of said salt is selected from Group I-A, II-A, IV-A, or VII-B of the Periodic Table (Merck index, sixth edition).

2. The method of claim 1 wherein the salt is present in

TABLE

| Ex. No. | Metal citrate | Weight of metal citrate, gm. | Ratio of terephthalic acid to ethylene glycol | Esterification time, hrs./min. | Prepolymer carboxyl content, meq./kg. | Condensation catalyst | Concentration wt. percent | Intrinsic viscosity | Polymer carboxyl content, meq./kg. | Melting Pt., °C. |
|---|---|---|---|---|---|---|---|---|---|---|
| 1 | None |  | 1:2 | 3:40 | 316 |  |  | 0.30 |  |  |
| 2 | Calcium citrate, $Ca_3(C_6H_5O_7)_2 \cdot 4H_2O$ | 0.029 | 1:2 | 2:33 | 191 | $Sb_2O_3$ | .04% | 1.10 | 18 | 258 |
| 3 | Lead citrate, $Pb_3(C_6H_5O_7)_2 \cdot 3H_2O$ | 0.053 | 1:2 | 3:00 | 54 | $Sb_2O_3$ | .04% | 0.94 | 33 | 259 |
| 4 | Lithium citrate, $Li_3C_6H_5O_7 \cdot 4H_2O$ | 0.014 | 1:2 | 2:15 | 200 | $Sb_2O_3$ | .04% | 0.95 | 34 | 260 |
| 5 | Manganese citrate, $MnHC_6H_5O_7$ | 0.012 | 1:2 | 3:05 | 95 | $Sb_2O_3$ | .04% | 0.60 | 29 | 261 |
| 6 | Sodium citrate, $Na_3C_6H_5O_7 \cdot 2H_2O$ | 0.015 | 1:2 | 3:45 | 160 | $Sb_2O_3$ | .04% | 1.10 | 32 | 260 |

The intrinsic viscosity of the polyester resin products of the above examples were measured in a 60% phenol and 40% tetrachloroethane solution (wt./wt.) at 30° C.

The results shown in the above table indicate that the presence of a metal citrate during the direct esterification step in the production of polyester resin, in general, facilitates the preparation of and improves the prepolymer formed and in turn, the polyester resin product. Through the use of such an additive, the direct esterification reaction time is reduced and the resulting prepolymer is, in general, characterized as being a more highly esterified product than one produced when no esterification additive is used as indicated by the carboxyl content of the prepolymer. Further, the prepolymers of the present method can be condensed to yield polyester resins which have high molecular weights as indicated by their intrinsic viscosity and which are suitable for filament-forming purposes.

The process of the present invention has been described with particular reference to polyethylene terephthalate; however, it will be obvious that the subject invention inan amount ranging from about $5 \times 10^{-6}$ to about $5 \times 10^{-2}$ mole per mole of terephthalic acid.

3. The method of claim 1 wherein the salt is calcium citrate.

4. The method of claim 1 wherein the salt is lead citrate.

5. The method of claim 1 wherein the salt is lithium citrate.

6. The method of claim 1 wherein the salt is manganese citrate.

7. The method of claim 1 wherein the salt is sodium citrate.

References Cited

FOREIGN PATENTS 1,297,516    5/1962    France.

WILLIAM H. SHORT, Primary Examiner

LOUISE P. QUAST, Assistant Examiner

U.S. Cl. X.R.

260—475